United States Patent
Sun et al.

(10) Patent No.: US 10,851,448 B2
(45) Date of Patent: Dec. 1, 2020

(54) HIGH PERFORMANCE TITANIUM CONNECTING SEALING RING FOR DEEP-SEA OIL DRILLING AND PRODUCTION DEVICE AND PROCESSING METHOD

(71) Applicant: BAOJI YIXIN METALS PRODUCT WORKS, Baoji (CN)

(72) Inventors: Zicheng Sun, Baoji (CN); Min Sun, Baoji (CN); Wukun Wang, Baoji (CN)

(73) Assignee: BAOJI YIXIN METALS PRODUCT WORKS, Baoji (CN)

( * ) Notice: Subject to any disclaimer, the term of this patent is extended or adjusted under 35 U.S.C. 154(b) by 114 days.

(21) Appl. No.: 15/755,503

(22) PCT Filed: Aug. 10, 2016

(86) PCT No.: PCT/CN2016/000442
§ 371 (c)(1),
(2) Date: Feb. 26, 2018

(87) PCT Pub. No.: WO2017/036054
PCT Pub. Date: Mar. 9, 2017

(65) Prior Publication Data
US 2018/0266560 A1    Sep. 20, 2018

(30) Foreign Application Priority Data
Sep. 6, 2015   (CN) .......................... 2015 1 0586413

(51) Int. Cl.
| | |
|---|---|
| *C22F 1/18* | (2006.01) |
| *B21J 1/06* | (2006.01) |
| *B21J 5/08* | (2006.01) |
| *F16L 23/20* | (2006.01) |
| *F16J 15/08* | (2006.01) |
| *F16J 15/12* | (2006.01) |

(52) U.S. Cl.
CPC ................ *C22F 1/183* (2013.01); *B21J 1/06* (2013.01); *B21J 5/08* (2013.01); *F16J 15/0806* (2013.01);
(Continued)

(58) Field of Classification Search
CPC ...................................................... C22F 1/183
See application file for complete search history.

(56) References Cited

U.S. PATENT DOCUMENTS

| | | | |
|---|---|---|---|
| 2006/0145426 | A1 | 7/2006 | Schroeder et al. |
| 2010/0052261 | A1 | 3/2010 | Maldonado |

FOREIGN PATENT DOCUMENTS

| | | |
|---|---|---|
| CN | 101081426 A | 12/2007 |
| CN | 201363414 Y | 12/2009 |

(Continued)

OTHER PUBLICATIONS

Davis. Metals Handbook Desk Edition. 2nd Ed. ASM International p. 578-584 (1998) (Year: 1998).*

(Continued)

*Primary Examiner* — Keith D. Hendricks
*Assistant Examiner* — Joshua S Carpenter
(74) *Attorney, Agent, or Firm* — Haug Partners LLP

(57) ABSTRACT

The provided are a high-performance titanium connecting sealing ring for deep-sea oil drilling and production device and a processing method. The sealing ring comprises a ring-shaped ring body, wherein the center hole of the ring body is an inner circumferential surface; a ring-shaped convex plate, a platform, an inclined end surface and a flat end surface are arranged in sequence in the circumferential direction of the outer circumferential surface of the ring body; and threads are processed in the inner circumferential surface. The processing method for the titanium connecting sealing ring mainly comprises the steps of preparation of (Continued)

titanium sponge, vacuum melting of a titanium ingot, forging and pressing, heating forging, heat treatment and machining.

3 Claims, 2 Drawing Sheets

(52) U.S. Cl.
CPC ........... *F16J 15/0887* (2013.01); *F16J 15/12* (2013.01); *F16L 23/20* (2013.01)

(56) References Cited

FOREIGN PATENT DOCUMENTS

| CN | 103014473 | A | 4/2013 | |
|---|---|---|---|---|
| CN | 203115092 | U | 8/2013 | |
| CN | 203585322 | U | 5/2014 | |
| CN | 104139141 | * | 11/2014 | ............... B21H 1/06 |
| CN | 104191168 | A | 12/2014 | |
| CN | 104438419 | A | 3/2015 | |
| CN | 105156672 | A | 12/2015 | |
| CN | 204985702 | U | 1/2016 | |

OTHER PUBLICATIONS

Espacenet machine translation of CN104139141 retrieved on Apr. 24, 2020 (Year: 2014).*
International Search Report and Written Opinion issued in corresponding International Application No. PCT/CN2016/000442.
Search Report issued in corresponding Chinese Application No. 2015105864137 and its English translation.

* cited by examiner

HIGH PERFORMANCE TITANIUM CONNECTING SEALING RING FOR DEEP-SEA OIL DRILLING AND PRODUCTION DEVICE AND PROCESSING METHOD

CROSS-REFERENCE TO RELATED APPLICATIONS

This application is the National Stage entry under 35 U.S.C. 371 of International Application No. PCT/CN2016/000442 filed on Aug. 10, 2016, published on Mar. 9, 2017 under Publication Number WO 2017/036054, which claims the benefit of priority under 35 U.S.C. § 119 of Chinese Patent Application Number 201510586413.7 filed Sep. 6, 2015.

TECHNICAL FIELD

The invention belongs to the technical field of non-ferrous metal processing, relates to titanium metal processing, and in particular relates to a high-performance titanium connecting sealing ring for deep-sea oil drilling and production device and a processing method therefor.

BACKGROUND ART

According to the discovery of the large-scale oil and gas fields in the world over the past decade or so, 60% to 70% of the newly-found oil reserves are originated from the oceans, in which about 45% to 50% of the reserves are found in the deep sea. As a result, the deep ocean has become the major area of oil and gas reserves in the world. From the view of the deep sea, the deep-sea oil and gas reserves in the world exceed 200 billion tons, in which oil accounts for 60% to 70% and natural gas accounts for 10% to 20%.

Therefore, the goal has already been orientated from the coast to the distant sea, however, deep-sea exploration and drilling technologies need to challenge the limit of human science and technology, all countries start to compete for deep-sea oil and gas resources, and China also aims at the development of deep-sea oil and gas fields. The drilling and development of the deep-sea oil and gas fields need a lot of sophisticated deep-water working device, but the current level of device in China is still relatively low. During deep-sea drilling for oil-gas exploitation, even if there is an accident probability of one in ten thousands, limited by the deep sea geological conditions, it is very difficult for manpower to find the most effective solution in a short period of time. Therefore, the working environment of deep-sea oil drilling, mining or conveying device (hereinafter referred to as "drilling device") is harsh, so that long life and high reliability are particularly important.

At present, in the oil drilling and production industry, deep-sea oil drilling and production device mostly adopts flanges made of steel (including stainless steel) to be butted and adopts bolts or complicated connecting components ("components") to connect two sections of oil pipelines, so that installation or replacement maintenance is tedious, and internal stress of the components after installation is not uniform. Therefore, when the components made of steel are usually used in the deep sea of 1000 m to 3000 m, due to poor resistance to seawater corrosion and shortcoming of short life, the accidents of oil leakage caused by fracture or damage or device failure are easily induced. The connecting sealing components made of steel must be replaced or repaired once corroded, but drilling and production devices in the deep sea are often not easy to repair or replace, therefore, as deep-sea oil drilling and production is developed toward deeper depth, especially used deep sea of 3000 m in depth, the connecting sealing components made of steel difficultly meet the needs of deep-sea oil drilling and production.

SUMMARY OF THE INVENTION

Titanium has the advantages of small density, high strength, high specific strength, small thermal expansion coefficient, corrosion resistance, good high temperature and low-temperature performance and the like. If the advantages are utilized, a titanium or titanium alloy sealing ring (referred to as "titanium connecting sealing ring") with a relatively simple structure is designed to replace steel connecting sealing components after the performance indicators are improved by a special processing process, the shortcomings can be effectively overcome, and the needs of deep-sea oil drilling and production device on long life, high pressure resistance, seawater corrosion and easy maintenance are achieved. Accordingly, the invention provides a titanium connecting sealing ring and a process method for processing the same.

In an aspect, the invention provides a titanium connecting sealing ring for deep-sea oil drilling and production device, which is provided with an inner thread for connecting two segments of oil pipes and can also be used for other devices. It can meet the use in deep sea with depth of 1000 m to 3000 m or deeper, can prolong the service life of drilling and production device and improve mining efficiency, and can also avoid the pollution to the marine environment due to oil leakage caused by corrosion or damage. Specific technical schemes adopted by the invention are as follows.

A high-performance titanium connecting sealing ring for deep-sea oil drilling and production device comprises a ring body (1), wherein the ring body (1) is of a ring shape, and the inner part of the ring body (1) is a center hole, and the titanium connecting sealing ring is characterized in that a ring-shaped convex plate (2), a platform (3), an inclined end surface (4) and a flat end surface (6) are arranged in sequence in the circumferential direction of the outer circumferential surface of the ring body (1); and inner threads (7) are processed in the inner circumferential surface (5) of the center hole.

Further, the convex plate (2) divides the outer circumferential surface of the ring body (1) into two parts; the axial width ratio of the convex plate (2) to the platform (3) to the inclined end face (4) is 3:2:4; and the convex plate (2) has a rectangular section.

Further, the inner circumferential radius (R1) of the ring body (1) is 223.5 mm; the first outer circumferential radius (R2) of the inclined end surface (4) is 250 mm, and the second outer circumferential radius (R3) is 284 mm; the outer circumferential radius (R4) of the convex plate (2) is 300 mm; and the axial width (L) of the ring body (1) is 150 mm, the axial width (N) of the convex plate (2) is 30 mm, the axial width of the platform (3) is 20 mm, and the axial width of the inclined end surface (4) is 40 mm.

Furthermore, the material is titanium or a titanium alloy.

Compared with the prior art, the technical effects of the present invention are as follows:

First, by adopting the structural design of the ring body, the convex plate, the platform, the inclined end surface and the inner threads of the titanium connecting sealing ring, the uniform distribution of the internal stress during the installation and use can be ensured, and the overall strength of the titanium connecting sealing ring is greatly increased. Second, the titanium connecting sealing ring is relatively simple in structure and easy to install, replace or maintain. Thirdly, one component is used for replacing the connection assembly with a plurality of components, so that the reliability is improved significantly. Fourthly, after heat-treated, the titanium connecting sealing ring has greatly increased performance indicators, such as tensile strength and yield strength, compared with similar titanium products.

Therefore, the titanium connecting sealing ring can be reliably used in the deep sea, can withstand huge deep-sea pressure and oil-gas delivery pressure, and can meet the needs of deep sea oil drilling and production device on long life, high pressure resistance, seawater resistance and easy maintenance.

In another aspect, the invention also provides a process method for processing the titanium connecting sealing ring, which is described as follows.

A processing method for the titanium connecting sealing ring is characterized by comprising the steps of preparation of titanium sponge, vacuum melting of the titanium ingot, forging and pressing, heating forging, heat treatment and machining, specifically comprising:

(a) the step of preparation of titanium sponge, comprising drying the selected and purchased sponge titanium with the particle size of 0.83-25.4 mm for later use;

(b) the step of vacuum melting of the titanium ingot, comprising pressing the dried sponge titanium into an electrode block, welding into a melting electrode by argon-arc welding, and carrying out vacuum melting in vacuum condition, wherein the vacuum melting is recycled at least two times; and cooling, and sampling for chemical analysis, wherein a Φ550 mm-650 mm titanium ingot is formed if qualified;

(c) the step of forging and pressing, comprising heating the titanium ingot to 950° C.-1200° C. and preserving heat for 250 min-380 min, carrying out three-upsetting three-pulling forging to form a long titanium billet, and then sawing and forging into a small titanium billet according to specification;

(d) the step of heating forging, specifically comprising three stages: a first stage: heating the small titanium billet to 760° C.-900° C., forging and preserving heat for 100 min-140 min, and forging to obtain a desired blank, and then punching to form the center hole to obtain a cavity blank, cooling, and grinding for the first time; a second stage: heating the cavity blank after the grinding for the first time to 800° C.-900° C., forging and preserving heat for 100 min-140 min, then reaming, cooling and grinding for the second time; and a third stage: heating the cavity blank after the grinding for the second time to 810° C.-880° C., forging and preserving heat for 100 min-140 min, and forging to form a titanium connecting sealing ring blank;

(e) the step of heat treatment, comprising heating the titanium connecting sealing ring blank to 650° C.-700° C. in the non-vacuum condition and preserving heat for 100 min-140 min, carrying out annealing treatment, cooling and sampling for physical performance test, and entering the machining step after qualified; and (f) the step of machining, comprising machining the convex plate, the platform, the inclined end surface, the flat end surface and the center hole by a machining tool, then grinding to obtain a bright titanium connecting sealing ring, and warehousing a finished product after qualified.

Further, in the step of forging and pressing, the titanium ingot is heated in an electric heating furnace at 1150° C. and kept for 350 min;

the vacuum degree of vacuum melting is 2 Pa to 10 Pa;

in the first stage of the heating forging step, the small titanium billet is preferentially heated at 860° C. for forging and kept for 120 min; in the second stage, the cavity blank after the grinding for the first time is heated to 850° C. for forging and kept for 120 min; and in the third stage, the cavity blank is heated to 840° C. for forging and kept for 120 min; and in the step of heat treatment, the heating temperature during annealing treatment is 680° C. and kept for 120 min.

Further, the center hole formed by the step of machining is a smooth inner circumferential surface or is processed into the inner thread according to the user requirement.

Through the experimental determination, the titanium connecting sealing ring produced according to the processing method has the characteristics that the tensile strength is 565 MPa, which is much higher than the US ASTM B381 standard on the tensile strength of ordinary titanium products by 62.3%; the yield strength is 460 MPa, which is much higher than the standard by 67.3%; the elongation is 25.2%, which is much higher than the standard by 26%; and the reduction of area is 44%, which is much higher than the standard by 46.7%.

Wherein 1 is the ring body, 2 is the convex plate, 3 is the platform, 4 is the inclined end surface, 5 is the inner circumferential surface, 6 is the flat end surface, 7 is the inner thread, R1 is the inner circumferential radius, R2 is the first outer circumferential radius of the inclined end surface, R3 is the second outer circumferential radius of the inclined end surface, R4 is the outer circumferential radius of the convex plate, L is the axial width of the ring body, N is the axial width of the convex plate, and M is the sum of the axial widths of the convex plate and two adjacent platforms.

DETAILED DESCRIPTION OF THE INVENTION

The specific embodiments of the titanium connecting sealing ring and the processing method therefor of the invention will be described in further detail below with reference to the accompanying drawings.

Figure 1:
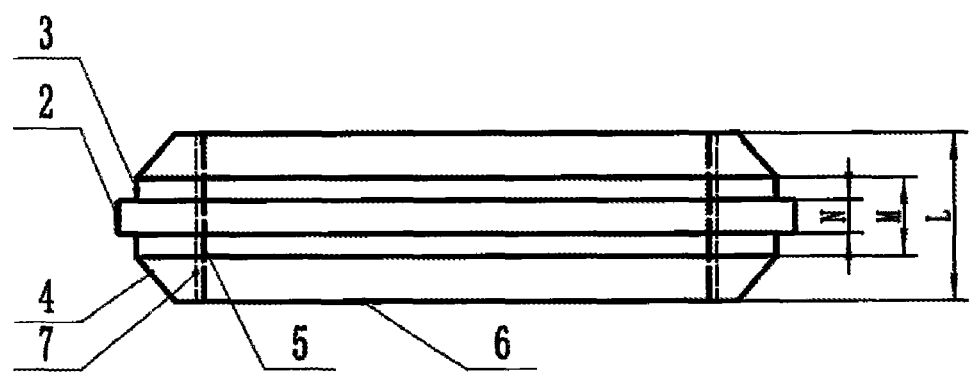
FIG. 1 is a front view of the titanium connecting sealing ring according to the invention.
Figure 2:
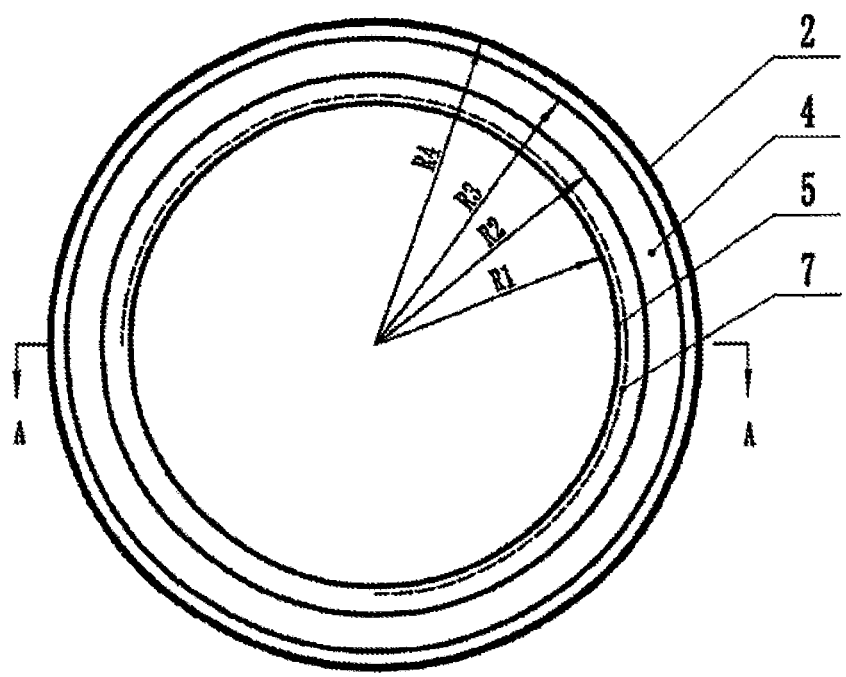
FIG. 2 is a top view of the titanium connecting sealing ring according to the invention.
Figure 3:
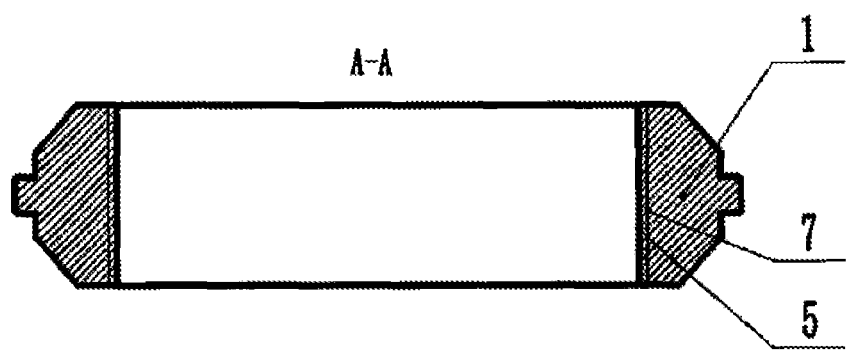
FIG. 3 is a cross-sectional view taken along line A-A of the top view of the titanium connecting sealing ring according to the invention.

First, FIG. 1 to FIG. 3 are a front view, a top view and a cross-sectional view taken along line A-A of the top view of the high-performance titanium connecting sealing ring for deep-sea oil drilling and production device according to the invention, wherein, L is the axial width of the ring body of the titanium connecting sealing ring, N is the axial width of the convex plate, and M is the sum of the axial widths of the convex plate 2 and two adjacent platforms 3. The ring body 1 according to the invention is a hollow cavity structure symmetrical relative to the convex plate 2. The inner surface of the hollow cavity is an inner circumferential surface 5, the outer surface of the hollow cavity is also a circumferential surface and the hollow cavity is provided with a convex plate 2, a platform 3 and an inclined end surface 4. As shown in FIG. 1 and FIG. 3, the ring-shaped convex plate 2, the platform 3, the inclined end surface 4 and the flat end surface 6 are sequentially arranged along an upward or a downward direction of the convex plate 2; a radial centerline of the convex plate 2 is vertically symmetrical, and the axial centerline of the convex plate 2 is bilaterally symmetrical; the axial section of the convex plate 2 is rectangular; the inner circumferential surface 5 along the ring body 1 can be smooth, or can be processed into the inner thread 7 according to the use requirement, which can be used for connecting the oil pipes or other oil device. Wherein the inner circumferential radius R1 of the ring body 1 and the first outer circumferential radius R2 of the inclined end surface 4 form the flat end surface 6, the first outer circumferential radius R2 and the second outer circumferential radius R3 of the inclined end surface 4 form the inclined end surface 4, and the second outer circumferential radius R3 and the outer circumferential radius R4 of the convex plate 2 form the convex plate 2. According to the client requirement, when the axial width L of the titanium connecting sealing ring, the axial width N of the convex plate 2, and the sum M of the axial widths of the two platforms 3 and one convex plate 2 are known, the axial width of the platform 3 can be calculated to be (M−N)/2 and the axial width of the inclined end surface 4 is (L−M)/2.

Further, the specific preferred scheme is as follows: the inner circumferential radius R1 is 223.5 mm, the first outer circumferential radius R2 is 250 mm, the second outer circumferential radius R3 is 284 mm and the outer circumferential radius R4 is 300 mm; the axial width L of the titanium connecting sealing ring is 150 mm, the axial width N of the convex plate 2 is 30 mm, the axial width of the platform 3 is 20 mm, and the axial width of the inclined end surface 4 is 40 mm.

Second, the processing method for the high-performance titanium connecting sealing ring for the deep-sea oil drilling and production device is specifically described as follows.

The processing method for the titanium connecting sealing ring for the deep-sea oil drilling and production device comprises the specific steps:

The purchased sponge titanium is screened to select the sponge titanium of level 0 and level 1, and the sponge titanium with the particle size of 0.83 mm to 25.4 mm is dried for later use. The sponge titanium is then pressed into an electrode block for melting, then the electrode block is welded into a melting electrode by argon arc welding, the melting electrode is subjected to vacuum melting under vacuum condition, and the vacuum melting is recycled at least two times; and after cooling, sampling is performed for chemical analysis to form a titanium ingot after qualified. The melting must be carried out in vacuum at least two times, the degree of vacuum for the vacuum melting is maintained at 2 Pa to 10 Pa, and 2 Pa, 4 Pa or 6 Pa is preferred. The twice melting aims to achieve uniform distribution of the chemical composition of the ingot, which is the key to the ingot quality. Among them, the sampling for composition analysis is sampling the melted titanium ingot for analysis, impurity elements such as iron, carbon, nitrogen, hydrogen, oxygen and other elements (residual elements) are mainly analyzed, and the analysis results meet the requirements of the user and the internal control standard of the enterprise. The forging and pressing is then performed, that is, the titanium ingot about T600 mm is heated to 1050° C. in an electric heating furnace, heat is preserved for 300 min, reversing three-upsetting three-pulling is performed on a 3500-ton forging press to form the billet of 500×500×l (l is the length of the billet), the billet is ground and then heated to 870° C., kept for 300 min, and forged into a small billet of 180×180×l, and then the small billet is cut according to the specification size of the titanium connecting sealing ring and then forged. The step of heating forging specifically comprises the following three stages: a first stage: heating the titanium ingot to 860° C., forging and preserving heat for 120 min, and forging to obtain a desired blank, and then punching the blank, cooling, and grinding for the first time; a second stage: heating the blank after the grinding for the first time to 850° C., preserving heat for 120 min, then reaming, cooling and grinding for the second time; and a third stage: heating the blank after the grinding for the second time to 840° C., preserving heat for 120 min, and forging to form the titanium connecting sealing ring blank. In the above three stages of forging, each stage ensures a certain amount of metal deformation to guarantee uniform microstructure of the material and to achieve good performance of the finished product. The step of heat treatment comprises carrying out annealing treatment on the blank at 650-700° C., preferably 680° C. for 120 min, under non-vacuum condition, cooling and sampling for physical performance test, and after qualification, lathing to form the convex plate 2, the platform 3, the inclined end surface 4, the flat end surface 6 or inner thread 7 by a numerically controlled lathe; whether the inner thread 7 is processed is determined according to the user requirements, and the titanium connecting sealing ring can be directly sold to the users without processing the inner thread 7; and then grinding is performed to obtain the bright titanium connecting sealing ring, and the finished product is warehoused after qualified. The purpose of heat treatment is to obtain a stable microstructure with good plasticity and a certain comprehensive performance. The annealing temperature is very important, the annealing is carried out under non-vacuum conditions, in order to reduce the oxidation and pollution degree of the titanium material, experiments are performed, and when the annealing temperature reaches 650° C., the tensile strength and yield strength decrease sharply with increasing temperature, and the elongation increases sharply with increasing temperature. When the annealing temperature is between 650° C. to 700° C., the tensile strength, yield strength, elongation changes slowly. This shows that the titanium connecting sealing ring has stable performance when annealing is performed at 650-700° C., and the annealing condition of the annealing temperature being 680° C. and heat preservation time being 120 min is feasible.

At present, according to the ASTM B381 standard in the United States, the requirement for the existing titanium products with similar applications is as follows: the tensile strength is 345 MPa, the yield strength is 275 MPa, the elongation is 20% and the reduction of area is 30%.

Through experimental determination, the titanium connecting sealing ring produced according to the processing method has the characteristics that the tensile strength is 565 MPa, which is much higher than the standard by 62.3%; the yield strength is 460 MPa, which is much higher than the standard by 67.3%; the elongation is 25.2%, which is much higher than the standard by 26%; and the reduction of area is 44%, which is much higher than the standard by 46.7%.

Figure 4:
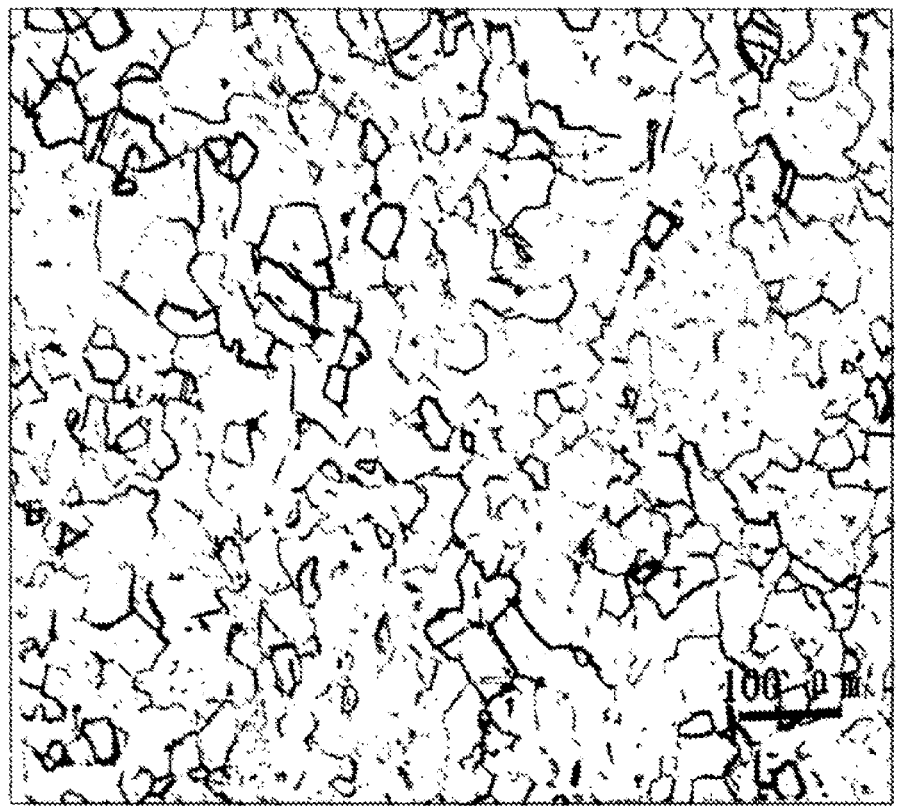
FIG. 4 is a metallographic structure picture of the titanium connecting sealing ring according to the invention.
Figure 5:
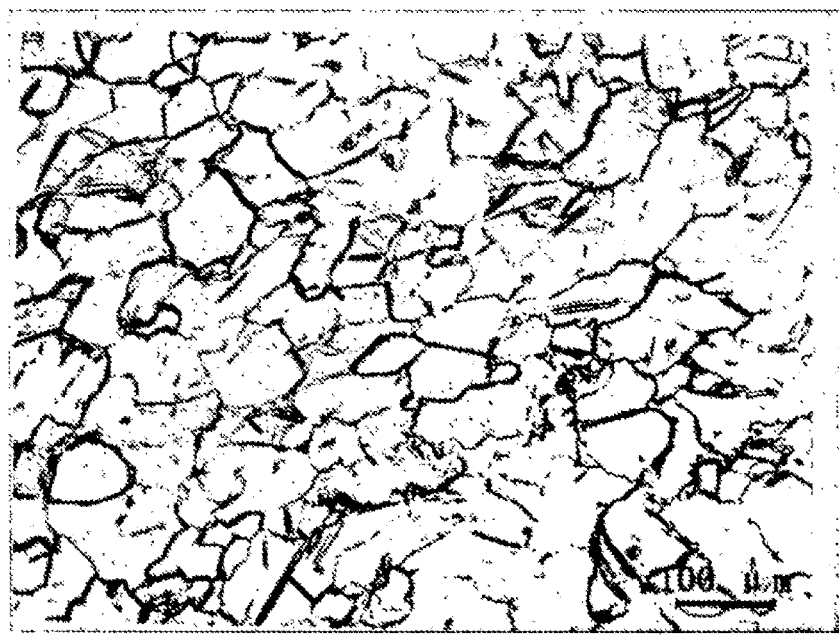
FIG. 5 is a metallographic structure picture of similar titanium products in the prior art.

Comparative analysis of the microstructure is performed. FIG. 4 is the metallographic microstructure picture of the titanium connecting sealing ring, which shows that the microscopic grain is fine, the structure is uniform and the performance is stable, that is, the titanium connecting sealing ring obtains good overall performance. FIG. 5 is the metallographic structure picture of similar titanium products in the prior art, which shows that the uniformity and fineness of the microstructure are poor, that is, the crystal grains are coarse and the crystal grains are not sufficiently broken.

It can be seen that after being processed by the processing method according to the invention, the titanium connecting sealing ring has significantly higher tensile strength, yield strength, elongation and reduction of area than the existing standards, and can be reliably used in the deep sea, can withstand the huge deep-sea pressure and oil and gas transmission pressure, and also meets the special needs of the users.

The invention claimed is:

1. A processing method for a titanium connecting sealing ring, comprising:
   (a) a step of preparing a titanium sponge, comprising:
      drying the titanium sponge;
   (b) a step of vacuum melting of a titanium ingot, comprising:
      (i) pressing the dried sponge titanium into an electrode block,
      (ii) welding the electrode block into a melting electrode by argon-arc welding,
      (iii) vacuum melting the melting electrode; and
      (iv) cooling the melting electrode after vacuum melting, and sampling for chemical analysis, wherein a titanium ingot is formed;
   (c) a step of forging and pressing, comprising:
      (i) heating the titanium ingot to 950° C.-1200° C. and preserving heat for 250 min-380 min,
      (ii) forming a long titanium billet, and
      (iii) sawing and forging the long titanium billet into a small titanium billet according to a specification;
   (d) a step of hot forging, comprising three stages:
      in a first stage:
         heating the small titanium billet to 760° C.-900° C.,
         forging the small titanium billet to obtain a desired blank,
         punching the desired blank to form a center hole to obtain a cavity blank,
         cooling the cavity blank, and
         grinding the cavity blank for a first time;
      in a second stage:
         heating the cavity blank, after the grinding for the first time, to 800° C.-900° C.,
         forging and preserving heat for 100 min-140 min,
         reaming the cavity blank,
         cooling the cavity blank, and
         grinding the cavity blank for a second time; and
      in a third stage:
         heating the cavity blank, after the grinding for the second time, to 810° C.-880° C.,
         forging and preserving heat for 100 min-140 min, and
         forging the cavity blank to form a titanium connection sealing ring blank;
   (e) a step of heat treatment, comprising:
      (i) heating the titanium connecting sealing ring blank to 650° C.-700° C. in a non-vacuum condition and preserving heat for 100 min-140 min, and
      (ii) cooling the titanium connecting sealing ring blank and entering a machining step; and
   (f) wherein the machining step comprises:
      machining, by a machining tool, the titanium connecting sealing ring blank into a titanium connecting sealing ring, wherein the titanium connecting sealing ring includes a convex plate, a platform, an inclined end surface, a flat end surface, and the center hole.

2. The processing method for the titanium connecting sealing ring according to claim 1,
   wherein the titanium sponge has a particle size of 0.83 mm to 25.4 mm;
   wherein a degree of vacuum in vacuum melting is 2 Pa to 10 Pa;
   wherein in the step of forging and pressing, the titanium ingot is heated in an electric heating furnace at 1150° C. and kept for 350 min;
   wherein in the first stage of the hot forging step, the small titanium billet is heated at 860° C. for forging and kept for 120 min; in the second stage, the cavity blank, after the grinding for the first time, is heated to 850° C. for forging and kept for 120 min; and in the third stage, the cavity blank is heated to 840° C. for forging and kept for 120 min; and
   wherein in the step of heat treatment, a heating temperature is 680° C. and kept for 120 min.

3. The processing method for the titanium connecting sealing ring according to claim 1, wherein the center hole formed by the step of machining is an inner circumferential surface or is processed into an inner thread.

* * * * *